United States Patent [19]

Shaffer

[11] Patent Number: 5,250,486
[45] Date of Patent: Oct. 5, 1993

[54] POLYPHENYLENE ETHER PROCESS AND RESIN COMPOSITION

[75] Inventor: Timothy D. Shaffer, Voorheesville, N.Y.

[73] Assignee: General Electric Company, Pittsfield, Mass.

[21] Appl. No.: 699,105

[22] Filed: May 13, 1991

Related U.S. Application Data

[62] Division of Ser. No. 629,538, Dec. 18, 1990, Pat. No. 5,037,943.

[51] Int. Cl.$^5$ .............................................. B01J 31/00
[52] U.S. Cl. .................................. 502/164; 502/167; 502/168; 502/169; 502/170; 502/172
[58] Field of Search .............. 502/164, 167, 168, 169, 502/170, 172

[56] References Cited

U.S. PATENT DOCUMENTS

| | | |
|---|---|---|
| 3,383,435 | 8/1967 | Cizek . |
| 3,956,242 | 5/1976 | Olander . |
| 3,965,069 | 6/1976 | Olander . |
| 4,054,553 | 10/1977 | Olander . |
| 4,097,462 | 6/1978 | Olander . |
| 4,378,305 | 3/1983 | Carlson ............................ 502/168 |

FOREIGN PATENT DOCUMENTS 0059958 9/1982 European Pat. Off. .
0403810A3 12/1990 European Pat. Off. .

*Primary Examiner*—Patrick P. Garvin
*Assistant Examiner*—Brent M. Peebles

[57] ABSTRACT

The invention provides a process for producing a polyphenylene ether by subjecting a 2,6-disubstituted phenol to oxidative coupling by introducing oxygen in the presence of a catalyst system which comprises a manganese compound, a chelant, a base, and an alpha,beta-unsaturated ketone, a beta-diketone, or a vinyl ether. The polyphenylene oxide produced has substantially no amine odor and more stable molecular weight, and is suitable for blending with styrenic or other resins to make thermoplastic resin blends of low odor and good physical properties.

15 Claims, No Drawings

POLYPHENYLENE ETHER PROCESS AND RESIN COMPOSITION

This is a division of application Ser. No. 07/629,538, filed on Dec. 18, 1990 now U.S. Pat. No. 5,037,943.

BACKGROUND OF THE INVENTION

1. Field of the Invention

The invention is directed to a polymerization process and a catalyst system for the production of polyphenylene ethers of controlled molecular weight and structure. The invention is also directed to polyphenylene ethers made by this process having stable melt behavior, low odor and other advantageous properties, and to thermoplastic blends of these polymers with other thermoplastics, these blends also having advantageous properties.

2. Brief Description of the Prior Art

The polyphenylene ethers and processes for their preparation are known in the art and described in numerous publications, including Hay, U.S. Pat. Nos. 3,306,874 and 3,306,875. Other procedures are described by Van Dort, U.S. Pat. No. 3,365,422, Bennett and Cooper, U.S. Pat. Nos. 3,639,656, 3,642,699, 3,733,299, 3,838,102, 3,661,848 and 4,092,294, and Olander, U.S. Pat. No. 4,054,553 and 4,083,828. All of these patents are incorporated herein by reference.

The processes most generally used to produce the polyphenylene ethers involve the self-condensation of a monovalent phenol in the presence of an oxygen-containing gas and a catalyst, generally a metal salt or complex, most typically a copper or manganese compound.

Many processes utilizing manganese compounds as part of the catalyst system have been proposed. Of these, most utilize a manganese compound combined with a basic compound, such as sodium hydroxide, and an amine ligand. Examples of such processes are given in Olander, U.S. Pat. Nos. 4,054,553 and 4,083,828, and by Nagaoka et al., U.S. Pat. No. 4,868,276. Systems of this type are noteworthy because of their high catalytic activity, however, the molecular weight of the polymers thus produced cannot be easily controlled. Moreover, in all of these systems, the produced polymers incorporate nitrogen from the amine ligand, giving rise to structures believed to be of the so-called Mannich type, having aminomethyl groups located ortho to the phenolic hydroxyl on end groups of the polymer chain and ortho to the oxygen in position 1 on repeating units of the polymer chain. Such structures are known to be unstable on heating, generating malodorous amines and quinone methide structures which are reactive.

If the amine ligand is omitted, the aminomethyl groups of course cannot form, but in their place, the polymer tends to have relatively unstable benzylic ether structures adjacent to the phenolic hydroxyl on chain ends and adjacent to the position 1 oxygen on repeating units in the polymer chain; this chemistry is described by White and Nye, Macromolecules 1990, 23, 1318ff. Such polymers are more branched than their counterparts made using amine ligands. Polymers of the type made without amine ligands tend to lose molecular weight and increase their polydispersity on heating, presumably due to chain scission and loss of branches. Loss of molecular weight on heating and increase of polydispersity (broadening of molecular weight distribution) is generally considered an undesirable characteristic for a thermoplastic resin, associated with decline of mechanical properties, poor flow properties during processing, problems in compatibility of blends, and difficulty of reworking scrap. The manufacture of wholly satisfactory polymers using manganese catalysts therefore has hitherto not been achieved; with amine ligands the products have had an odor problem, while without amine ligands, the products have had a thermal stability (molecular weight stability) problem.

My invention provides a process for making polyphenylene ethers which affords control over molecular weight and polymer structure. It makes available thereby new polyphenylene ethers of controlled molecular weight and structure, which exhibit stable or slightly increasing molecular weight on heating, and which have little or low amine nitrogen content and consequently little or no amine odor emissions on heating. These new polyphenylene ethers are useful in thermoplastic blends having stable flow properties and reduced odor.

SUMMARY OF THE INVENTION

My invention provides an improved process for making a poly(2,6-di-substituted-phenylene) ether by subjecting the corresponding 2,6-disubstituted phenol to oxidative coupling conditions by introducing oxygen in the presence of a catalyst system comprising:

(a) a manganese compound;
(b) a chelating agent;
(c) a base;
(d) an unsaturated compound selected from the class consisting of alpha,beta-unsaturated ketones, beta-diketones having at least one hydrogen on the carbon atom between the ketone carbonyl groups, and a vinyl ether; and
(e) optionally a phase transfer agent.

In its composition aspect, the invention provides easily-processible poly(2,6-disubstituted-phenylene) ethers of controlled molecular weight and good flow properties, having end groups incorporating the aforementioned ketones. Blends of these polyphenylene ethers have the advantages of good flow, substantial freedom from change of melt viscosity caused by thermal degradation during heating, and low odor.

DETAILED DESCRIPTION OF THE INVENTION

The following discussion presents the manner and process of conducting the process of the invention and preparing the product of the invention, and the best method of carrying out the invention.

The process of the invention comprises an oxidative polymerization for the preparation of polyphenylene ethers which comprise a plurality of structural units having the formula:

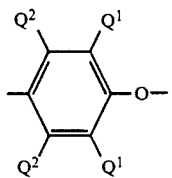

In each of said units independently, each $Q^1$ is independently halogen, primary or secondary lower alkyl (i.e. alkyl containing up to 7 carbon atoms), phenyl, and hydrocarbonoxy; and each $Q^2$ is independently hydrogen, halogen, primary or secondary lower alkyl, phenyl, or hydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. The preferred polyphenylene ethers that are prepared by the process of the invention are those wherein both $Q^1$ radicals are hydrocarbon radicals having from 1 to 8 carbon atoms and $Q^2$ are each hydrogen or one $Q^2$ is hydrogen and the other is a hydrocarbon radical having from 1 to 8 carbon atoms. The especially preferred polyphenylene ethers are those where both $Q^1$ are methyl and at least one $Q^2$ is hydrogen and one or no $Q^2$ is methyl. The preferred polyethylene ethers include those which are made by polymerization of 2,6-dimethylphenol (also known as 2,6-xylenol) or combinations thereof with 2,3,6-trimethylphenol. Further discussion of the structure of polyphenylene ethers is found, for instance, in White et al., U.S. Pat. No. 4,806,602 (February 1989) and U.S. Pat. No. 4,760,118 (July 1988) as well as in White, U.S. Pat. No. 4,670,537 (June 1987) which are incorporated herein by reference.

The polymers thus formed by the process of the invention will hereinafter be called, for brevity, polyphenylene ethers, and it will be understood that such polyphenylene ethers have substituents as defined above.

The phenols which are the starting material for the oxidative polymerization are those which have the substituents $Q^1$ and $Q^2$ as defined above together with a substituent X in the 4 position, as shown by the formula:

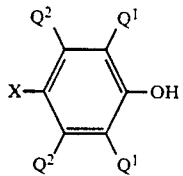

where X is hydrogen or halogen, preferably bromine or chlorine. These phenols when described herein for brevity as 2,6-disubstituted phenols are meant to include those which have one or two additional substituents as hereinabove defined, in the 3 and/or position.

Representative of phenols of the above formula which can be employed, either alone or in admixture, are the following: 2,6-dimethylphenol, 2,6-diethylphenol, the 2,6-dibutylphenols, 2,6-dilaurylphenol, the 2,6-dipropylphenols, 2,6-diphenylphenol, 2,6-dimethoxyphenol, 2,3,6-trimethylphenol, 2,3,5,6-tetramethylphenol, 2,6-diethoxyphenol, 2-methoxy-6-ethoxyphenol, 2-ethyl-4-stearylphenol, the 2,6-di(chlorophenoxy)phenols, 2,6-dimethyl-3-chlorophenol, 2,3-dimethyl-4-chlorophenol, 2,6-dimethyl-3-chloro-5-bromophenol, 2-methyl-6-isobutylphenol, 2-methyl-6-phenylphenol, 2,6-dibenzylphenol, 2,6-ditolylphenol, 3,6-di(2',4'-dichlorophenyl)-3-allylphenol, etc. Other specific examples of other phenols of Formula I are described in Hay's U.S. Pat. No. 3,306,875 and are hereby incorporated in their entirety by reference. An especially presently preferred phenol in the practice of this invention is 2,6-dimethylphenol (also known as 2,6-xylenol) because of its extended use in current polyphenylene oxide production. A second preferred phenol is a mixture of 2,6-dimethylphenol and 2,3,6-trimethylphenol, for the same reason.

The oxygen required for the process of the invention may be provided as pure oxygen or as air, at atmospheric, subatmospheric or superatmospheric pressure. At least an amount equivalent to the phenol oxidized must be introduced over the course of the reaction in those cases where X=H in the phenol. However, where X=halogen in the starting phenol, the oxygen need only be present as a principal constituent of the atmosphere to which the reaction mixture is exposed, with little or no net consumption of oxygen. Oxygen concentrations of from about 0.01% to 100% are usable, but the reaction will proceed more slowly with the lower concentrations. A convenient concentration of oxygen is that of air (about 21%). It is adequate to merely stir the reaction mixture under air, although air or oxygen or an oxygen-containing gas can also be bubbled through the mixture.

In the practice of the process of the present invention, the amount of the solvent is not critical, it only being necessary that the solvent provide a liquid phase for the phenol starting material. Suitable solvents are any substantially water-insoluble and substantially inert organic solvent, examples including aliphatic hydrocarbons such as octane or cyclohexane and aromatic hydrocarbons such as benzene, toluene, xylene, methylnaphthalenes, cumene, pseudocumene, or the like. The solvents may be chlorinated alkali-resistant solvents, such as chloroaromatic solvents, exemplified by chlorobenzene, ortho-dichlorobenzene, chlorotoluene, trichlorobenzene and the like. Other solvents mentioned in the Hay patents may also be employed. However, it is advantageous to employ an inert aromatic solvent such as benzene or toluene as the reaction medium. The term "inert aromatic solvent" means an aromatic solvent which does not enter into or adversely affect the desired course of the reaction. Optionally, a small quantity of alcohol such as methanol is also used to dissolve the manganese component of the catalyst system to facilitate its addition.

The manganese compounds suitable for use in the catalyst system of the present invention include manganese (II) salts such as halides, i.e. manganese (II) chloride (also known as manganese chloride), manganese (II) bromide, manganese (II) iodide, etc. as well as other manganese (II) compounds such as manganese (II) carbonate, manganese (II) oxalate, manganese (II) sulfate, manganese (II) acetate, manganese (II) nitrate, manganese (II) phosphates, etc., including hydrated forms of such manganese (II) compounds. In addition, other manganese salts such as manganese (VII) salts, i.e. potassium permanganate may be employed. While specific reference is made hereafter to various manganese (II) salts, it is to be understood that the invention is not limited to manganese (II) salts.

Usually the amount of manganese ion will range from 0.1 to 1 part by weight per 100 parts of phenolic monomer employed in the process.

The chelant can be, broadly, any bidentate or polydentate ligand having bonding affinity for manganous ion such that it maintains at least bidentate ligand behavior towards manganese in the presence of water and the phenol in the presence of base. A preferred class of chelants are oximes having a nearby hydroxyl group (i.e. sufficiently close to bond to the same Mn as the oxime). Examples include benzoinoxime, anisoinoxime, paradimethylaminobenzoinoxime, furoinoxime, acetoinoxime, methylhydroxybutanoneoxime, alpha-hydroxyacetophenoneoxime, 2-methyl-2-hydroxy-4-pentanoneoxime, phenylhydroxybutanoneoxime, salicylaldoxime, 2-hydroxy-5-chlorophenylaldoxime, 5-methylsalicylaldoxime, 2-hydroxy-5-bromophenylaldoxime, 2-hydroxy-5-methylacetophenoneoxime, etc. including combinations thereof. Other chelants having at least bidentate ligand properties towards manganous ion include salicylaldehyde)ethylenediimine, dimethylglyoxime, diphenylglyoxime, 2-aminoethanol, 2-oxime-3-butanone, alpha-aminobutyric acid, 8-hydroxyquinoline, o-benzenedithiol, 2-mercaptoethylamine, pyridinealdazine, salicylideneamino-o-hydroxbenzene, 1,6-bis-(alpha-pyridyl)-2,4-diazahexane, N,N'-ethylenebis-2-(o-hydroxyphenyl)glycine, etc.

The manganese compound can be introduced as a preformed chelate, and this mode is preferred because of the catalyst is thus available in the reaction mixture more rapidly and reliably. The chelate can be any of those described by Olander in U.S. Pat. No. 3,956,242 issued May 11, 1976 or in U.S. Pat. No. 4,054,553 issued Oct. 18, 1977, whose descriptions are hereby incorporated in this application by reference. Illustrative of suitable manganese chelate complexes that can be employed are the following compounds: Mn(II) bis(benzoinoxime), Mn(II) bis(anisoinoxime), Mn(II) bis(paradimethylaminobenzoinoxime), Mn(II) bis(furoinoxime), Mn(II) bis(acetoinoxime), Mn(II) bis(methylhydroxybutanoneoxime), Mn(II) bis(alpha-hydroxyacetophenoneoxime), Mn(II) bis(2-methyl-2-hydroxy-4-pentanoneoxime), Mn(II) bis(phenylhydroxybutanoneoxime), Mn(II) bis(salicylaldoxime), Mn(II) bis(2-hydroxy-5-chlorophenylaldoxime), Mn(II) bis(5-methylsalicylaldoxime), Mn(II) bis(2-hydroxy-5-bromophenylaldoxime), Mn(II) bis(2-hydroxy-5-methylacetophenoneoxime), etc. including combinations thereof. Both in the specification and in the appended claims, the complexes which are members of the classes set out in U.S. Pat. No. 3,956,242 issued May 11, 1976 are described therein as Type A complexes, i.e. complexes which promote the formation of polyphenylene oxide having an intrinsic viscosity [Greek eta], greater than 0.30 dl./g. at 25° C., measured in chloroform under standard reaction conditions. These type A complexes are preferred. Standard reaction conditions are defined herein as the polymerization of 2,6-xylenol carried out under atmospheric pressure and a constant temperature of 25° C. in less than 120 minutes employing toluene and methanol as the solvent system where the weight ratio of 2,6-xylenol:toluene:methanol is 10%, 81% and 9%, respectively (10% monomer solids), the proportions by weight of 2,6-xylenol to sodium hydroxide is 16.39:1 and the mole proportions of 2,6-xylenol to manganese chelate is 100:1. Illustrative of other preferred manganese chelate complexes that can be employed, described in greater detail in Olander, U.S. patent application Ser. No. 534,903, are mixtures containing a Type A complex, referred to above, and a Type B complex. Type B complexes include the following compounds: Mn(II) bis(salicylaldehyde)ethylenediimine, Mn(II) bis(dimethylglyoxime), Mn(II) bis(diphenylglyoxime), Mn(II) bis(2-aminoethanol), Mn(II) bis(2-oxime-3-butanone), Mn(II) bis(alpha-aminobutyrate), Mn(II) bis(8-hydroxyquinoline), Mn(II) bis(o-benzenedithiol), Mn(II) bis(2-mercaptoethylamine), Mn(II) bis(pyridine-aldazine) (N,N,N), Mn(II) bis(salicylideneamino-o-hydroxbenzene), Mn(II) bis(1,6-bis(alpha-pyridyl)-2,4-diazahexane(N,N,N,N), Mn(II) bis(N,N'-ethylenebis-2-(o-hydroxyphenyl)glycine), etc.

Both in the specifications and in the appended claims, complexes which are members of the Type B manganese chelate compound class set out by Olander, in U.S. patent application Ser. No. 534,903 are described herein as Type B complexes, i.e. complexes which promote the formation of polyphenylene oxides having an intrinsic viscosity [Greek eta] equal to or less than 0.30 dl./g. at 25° C., measured in chloroform under standard reaction conditions as defined hereinbefore. Where the chelate is formed in situ rather than introduced preformed, the quantity of chelant will typically be about equimolar to the manganese although exact equivalency is not required. Excess chelant or excess unchelated manganese ion will not prevent the process from performing properly but may be viewed as superfluous material.

Regarding the quantity of the manganese chelate which constitutes an effective amount, the mole proportions can very widely to provide the desired degree of promotion of the reaction rate. In general, however, the ratio of moles of phenol to gram atoms of manganese in the chelate is within the range of 100:1 up to 12,000:1 but preferably in the range of 500:1 to 3000:1.

The alkali to be used can be any substantially water-soluble base sufficiently alkaline to afford some of the anion of the phenolic starting material. Thus, suitable alkalis include the alkali metal hydroxides and carbonates, exemplified by lithium, sodium and potassium hydroxides or carbonates, and calcium hydroxide. Quaternary bases such as tetramethylammonium hydroxide can be used also. However, for reasons of economy and freedom from side reactions, the alkali metal hydroxides such as sodium hydroxide or potassium hydroxide are preferred. The amount of alkali or other strong base per mole of monomer (i.e. 2,6-di-substituted phenolic compound) needs only be enough to keep the reaction mixture alkaline, in the cases where the phenol is not one which releases hydrogen halide on polymerization (i.e. where X=H), but where the phenol is one which does release hydrogen halide on polymerization (i.e. where X=halogen), an excess over one molar equivalent of alkali is required in order to have the reaction mixture stay alkaline as the reaction progresses. Thus, in general, an effective amount of alkali is that amount which permits the reaction mixture to stay alkaline through the course of the reaction. This could be as little as 1 mole of alkali per 500 moles of phenol where the phenol is one where X=H, to several moles, and from slightly over 1 mole per mole of phenol up to as much as about 50 moles, of alkali per mole of phenol where X=halogen.

The ketone required for the process and catalyst system of the invention is an alpha-beta unsaturated ketone or a beta-diketone having at least one hydrogen on the carbon between the ketone groups. The category of alpha,beta-unsaturated ketones includes those which have a double bond as well as a triple bond located alpha,beta to the ketone carbonyl group. Examples include methyl vinyl ketone, methyl ethinyl ketone, stearyl vinyl ketone, phenyl vinyl ketone, dibenzoylethylene, dibenzoylacetylene, chalcone (benzylidineacetophenone), bis(2-phenylvinyl ketone, mesityl oxide, isophorone, phorone, and indone. Examples of suitable beta-diketones include acetylacetone, dibenzoylmethane, tribenzoylmethane, and benzoylstearoylmethane. Suitable alpha,beta-unsaturated ketones and beta-diketones can be substituted by non-interfering groups such as hydrocarbyl or hydrocarbyloxy, for example, provided that there is at least one hydrogen atom on the carbon between the carbonyl groups. Interfering groups are those which would consume one of the reactants, such as chloroalkyl or ester structures which would consume the alkali; the selection of non-interfering groups would thus be evident to one skilled in organic chemistry. Preferred alpha,beta-unsaturated ketones are methyl vinyl ketone, stearyl vinyl ketone, phenyl vinyl ketone, cyclopentenone, 2-cyclohexenone, mesityl oxide, isophorone, dibenzoylethylene, chalcone, and divinyl ketone. Preferred beta-diketones are acetylacetone and dibenzoylmethane.

Besides the aforementioned ketones, vinyl ethers have been found effective in the catalyst system of the invention. Examples of vinyl ethers are alkyl vinyl ethers such as methyl vinyl ether, ethyl vinyl ether, butyl vinyl ether and stearyl vinyl ether, as well as aryl vinyl ethers such as phenyl vinyl ether. Divinyl ether is also within the scope of usable compounds, as are cyclic vinyl ethers such as dihydropyran.

It is noteworthy that other olefins and other ketones not fitting the above-described requisites do not perform in the process and catalyst of the invention. It is hypothesized that the ketones and vinyl ethers which perform well in the process of the invention may do so by preventing the formation of benzylic ether structures, by functioning as dienophiles and capping transitory quinone methide chain ends to produce thermally-reversible Diels-Alder adducts. Thus, the diketones that work well are those which are enolizable to alpha,beta unsaturated ketones. However, applicant does not wish to be bound by this theory. The amount of the unsaturated compound, e.g. the alpha-beta unsaturated ketone, diketone or vinyl ether to be used in the catalyst system of the invention may range from about 1:1000 mole ratio with respect to the 2,6-disubstituted phenol to about 20:1000 mole ratio relative to the phenol, with the most typical range being from about 1.5:1000 mole ratio relative to the phenol to about 15:1000 mole ratio relative to the phenol.

The phase transfer agent for optional use in the process and catalyst of the invention may advantageously be a quaternary ammonium compound, although it could also be a quaternary phosphonium compound or a crown ether. Representative of the quaternary ammonium compounds are compounds of the formula:

$$[N(R^1)(R^2)(R^3)(R^4)]^+ \, X^-$$

wherein $R^1$, $R^2$, $R^3$, and $R^4$ are alkyl, aralkyl or alkenyl groups of from 1–24 carbon atoms and $X^-$ is an anion. The preferred anions are halides (such as bromide or chloride), sulfate or phosphate.

Mixtures of the ammonium salts may also be employed and preferably the total number of carbon atoms in the $R^1$, $R^2$, $R^3$, and $R^4$ substituents should be at least 10. The reaction catalyzing concentration of the quaternary ammonium salts is in the range of from 50–10,000 ppm based on the organic reaction solvent, and more preferably 100–2000 ppm, based on the organic reaction solvent.

The alkyl substituents of the quaternary ammonium compound may be methyl, ethyl, propyl, butyl, hexyl, octyl, decyl, cetyl, hexadecyl, and isomers thereof. Mixtures of these groups may also be employed. The aralkyl (i.e. alkyl substituted by aryl) substituent may include such radicals having from 7 to 20 carbon atoms such as benzyl, phenylethyl and the like. The alkenyl substituents include straight and branched chain unsaturated hydrocarbon radicals of from 1 to 24 carbon atoms which contain one or more double bonds.

The quaternary ammonium compounds are well known and many are commercially available. For example, reference may be made to Kirk-Othmer Encyclopedia of Chemical Technology, 2nd Edition, Vol. 16, pp. 859–865; Arquads, Armour Industrial Co. (1956) and Schwartz, A. M. et al., Surface Active Agents, Vol. I, pp. 156–171, Interscience Publishers (1949); and Vol. II, pp. 112–118 (1958). A particularly useful material available commercially under the name Adogen R464 (Aldrich Chemical Co.) has the composition methyltrialkyl ($C_8$–$C_{10}$)ammonium chloride.

The reaction temperature is broadly from the freezing point of the aqueous base up to about the boiling point, although the preferred range is from about 0° C. to about 80° C. and most preferred is from ambient, say 5° C. to about 60° C.

The reaction time is from about 10 minutes to about 10 hours, preferably about 20 minutes to about 2 hours. The reaction is advantageously terminated when the conversion of monomer (phenol) to polymer reaches about 90 to about 95%, which can be ascertained by isolation of polymer from a reaction batch sample, determination of released halide ion, infrared, nmr or other analytical means. Longer times can cause undesirable over-oxidation to take place with formation of colored and excessively branched polymer products. Shorter times cause inadequate conversion.

The process of the invention makes available polyphenylene ether resins of controlled molecular weight, low odor and substantial freedom from degradation of molecular weight on heating, these resins being suitable for blending with styrenic thermoplastic resins to make useful blended plastics of especially low color, odor, and viscosity stability on processing. The styrenic resins with which the polyphenylene ether resins are blended to produce useful plastic blends are well known and will comprise at least 25% by weight of units derived from monomers of the formula:

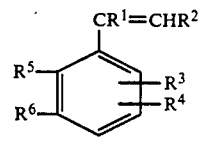

wherein $R^1$ and $R^2$ are selected from the group consisting of (lower) alkyl or alkenyl groups of from 1 to 6 carbon atoms and hydrogen; $R^3$ and $R^4$ are selected from the group consisting of hydrogen and (lower)alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred monomer for preparation of the styrenic resins for use in the invention, but at least one comonomer can also be used with styrene, such as acrylonitrile, an acrylate ester, a methacrylate ester, a butadiene, or a halogenated styrene such as chlorostyrene or dibromostyrene. Compositions of polyphenylene ethers and styrene resins are described by Cizek, U.S. Pat. No. 3,383,435 which is incorporated by reference.

In addition to the comonomers mentioned above, the styrene resins may include comonomer units derived from an alpha,beta-unsaturated cyclic anhydride of the formula $R^7—C(H)_n—C(R^8)—(CH_2)_m—R^9$ wherein the dotted lines represent a single or double carbon-to-carbon bond, $R^7$ and $R^8$ taken together represents a C(=O)—O—(=O) (anhydride) linkage, $R^9$ is selected from the group consisting of hydrogen, vinyl, alkyl, alkenyl, alkylcarboxylic or alkenylcarboxylic of from 1 to 12 carbon atoms, n is 1 or 2, depending on the position of the carbon-to-carbon double bond, and m is an integer of from 0 to about 10. Examples of such anhydrides include maleic anhydride, citraconic anhydride, itaconic anhydride, and the like.

Representative of the styrenic copolymers with which the polyphenylene ethers of the invention can be blended are low acrylonitrile content ABS (acrylonitrile-butadiene-styrene interpolymer) and SMA (styrene maleic anhydride copolymer).

Rubber may be used in the preparation of the styrene resins to upgrade the physical properties of these resins according to well known techniques. The rubber employed may be a polybutadiene rubber, butyl rubber, styrene-butadiene rubber, acrylonitrile rubber, ethylene-propylene copolymers, natural rubber, EPDM rubbers, polysulfide rubbers, polyurethane rubbers, epichlorohydrin rubbers and the like.

Furthermore, it is thought that polyphenylene ether resins produced by the process of the invention can subsequently be blended with other polymers or copolymers besides styrenic types, to form various mixtures and/or copolymers thereof. Nonlimiting examples of the other polymers or copolymers are polyesters, polyamides, polyimides (e.g., poly(etherimides), polyolefins, polycarbonates, copolyetheresters and block copolymers (diblock and triblock) of styrene and butadiene. General guidelines of preparing such materials are known in the art.

These mixtures and copolymers, as well as the polyphenylene ether-styrenic resin blends mentioned above, can include various other additives which impart or enhance a variety of characteristics. Illustrative additives are flame retardants, drip retardants, dyes, pigments, colorants, lubricants, reinforcing agents, fillers, antistatic agents, heat stabilizers, ultraviolet light stabilizers and plasticizers. Effective amounts of such additives are usually in the range, for each, of from about 0.1% by weight to about 50% by weight, based on the weight of the entire composition.

The novel process of the invention reaction is preferably carried out with air or oxygen, although mixtures of air or oxygen with inert gases besides nitrogen may be employed.

To carry out the process of the invention, typically, a suitable reaction vessel fitted with stirring means and heat removal means is charged with the solvent, the strong base solution, the manganese and chelating compound, optionally prereacted, and the phase transfer catalyst. A stream of oxygen or air is introduced near the bottom of the reaction vessel, or the reaction mixture is agitated under oxygen or air, and the monomer is added gradually over a period of about 30–40 minutes. Polymerization is carried out preferably until the conversion of phenol monomer is about 90% but not in excess of about 95%. The polymer may be recovered from the reaction mixture according to standard procedures such as precipitation by a non-solvent.

EXAMPLES

The process of my invention and the preparation of the catalyst system therefor is illustrated by the following examples:

To a stirred reactor, the following ingredients were added in the order given: 20 g. of a 40 wt. % 2,6-xylenol solution in toluene; 27.55 g. of a 0.036% Adogen R464 solution in toluene, 5.62 g. of methanol, 0.46 g. of 50 wt. % aqueous sodium hydroxide (which resulted in the mixture having an alkaline reaction to a pH indicator), and 0.759 millimoles (or other amount—see table) of chalcone (or other unsaturated compound—see table). The catalyst solution, 1.353 g. was then added. This consisted of 0.010 g. of manganous chloride, 0.14 g. of benzoin oxime and 1.329 g. of methanol. The two-phase solution was stirred and oxygen was bubbled through for approximately 70 minutes. The reaction was then stopped by eliminating the oxygen supply and neutralizing the mixture with acetic acid.

The water and organic phases were separated, and polymer was isolated from the organic phase by slow addition of this phase to stirred methanol. The precipitated polymer was removed by filtration, washed with methanol, and dried in vacuum. The intrinsic viscosities were determined by the method already described hereinabove. The weight average molecular weights (Mw) and the number average molecular weights (Mn) were both determined by gel permeation chromatography. Similar experiments were run with a number of dienophiles. The characteristics of the polymers made in these experiments are summarized in the following Table 1, below:

TABLE 1

| Ex. | Unsaturated compound | Ratio[1] | IV[2] | Mw[3] | Mw/Mn |
|---|---|---|---|---|---|
| 1 | chalcone | 11.95 | 0.25 | 27.2 | 2.8 |
| 2 | " | 12.46 | 0.47 | 60.0 | 2.1 |
| 3 | " | 10.70 | 0.53 | 68.0 | 2.1 |
| 4 | " | 7.85 | 0.65 | 82.7 | 2.1 |
| 5 | " | 6.24 | 1.10 | 173.6 | 3.0 |
| 6 | trans-dibenzoyl-ethylene | 11.95 | 0.19 | 21.0 | 2.3 |
| 7 | dibenzoylmethane | 11.85 | 0.23 | 29.9 | 2.6 |
| 8 | 3-butyne-2-one | 11.86 | 0.29 | 54.4 | 2.3 |
| 9 | ethyl Vinyl ether | 12.53 | 0.42 | 39.2 | 2.1 |
| Comparison experiments, not within the invention: | | | | | |
| 10 | 2-butene-1,4-diol | 12.12 | 1.54 | 185.0 | 5.1 |
| 11 | triphenylethylene | 11.73 | 1.46 | 184.9 | 5.1 |
| 12 | dicyclopentadiene | 12.24 | 1.08 | 129.9 | 3.0 |
| 13 | stilbene | 12.11 | 1.06 | 141.7 | 4.9 |
| 14 | 1-octene | 11.83 | 0.70 | 95.6 | 2.4 |

Notes to table:
[1] moles of unsaturated compound per 1000 moles of the phenol
[2] deciliters per gram at 25° C. in chloroform
[3] × $10^3$ The thermal stability o the above polymers was tested by exposure to 300° C. for 17 minutes. The properties were determined by viscosity measurements with results as shown in Table 2 below:

TABLE 2

| Ex. | Unsaturated compound | IV jump | Mw × $10^{-3}$ | Mw/Mn |
|---|---|---|---|---|
| 1 | chalcone | 0 | 38.6 | 3.3 |
| 2 | " | 0.05 | 56.6 | 4.1 |
| 3 | " | 0 | 93.2 | 6.0 |
| 4 | " | 0.07 | 84.0 | 5.2 |
| 5 | " | gel | 303.0 | 17.5 |
| 6 | trans-dibenzoylethyl- | 0 | 28.3 | 3.0 |

TABLE 2-continued

| Ex. | Unsaturated compound | IV jump | Mw × 10⁻³ | Mw/Mn |
|---|---|---|---|---|
| | ene | | | |
| 7 | dibenzoylmethane | 0.08 | 61.0 | 4.1 |
| 8 | 3-butyne-2-one | 0.04 | 41.8 | 3.1 |
| 9 | ethyl vinyl ether | 0 | 59.5 | 3.4 |
| | Comparison experiments, not within the invention: | | | |
| 10 | 2-butene-1,4-diol | −0.82 | 115.1 | 4.0 |
| 11 | triphenylethylene | −0.53 | 148.2 | 9.5 |
| 12 | dicyclopentadiene | −0.46 | 67.2 | 3.6 |
| 13 | stilbene | −0.57 | 80.2 | 5.9 |
| 14 | 1-octene | −0.07 | 55.5 | 4.3 |

The products of experiments 1-9 upon thermal treatment did not produce any noticeable amine-like odor.

What is claimed is:

1. A catalyst system for the oxidative polymerization of a 2,6-disubstituted phenol which comprises an effective amount of:
    (a) a manganese compound;
    (b) a chelating agent;
    (c) a substantially water-soluble base;
    (d) an unsaturated compound selected from the class consisting of alpha, beta-unsaturated ketones, beta-diketones having at least one hydrogen atom on the carbon between the ketone carbonyl groups, and a vinyl ether; and
    (e) optionally, a phase transfer agent.

2. The catalyst system of claim 1, wherein the manganese compound is present in an amount from 0.1 to 1 part per 100 parts by weight of the phenol.

3. The catalyst system of claim 1, wherein the manganese compound is selected from the group consisting of manganese (II) halides, manganese (II) carbonate, manganese (II) oxalate, manganese (II) sulfate, manganese (II) acetate, manganese (II) nitrate, manganese (I) phosphates, hydrated forms of any of the foregoing compounds, and manganese (VII) salts.

4. The catalyst system of claim 1, wherein components (a) and (b) are a preformed chelate.

5. The catalyst system of claim 4, wherein the preferred chelate is selected from the group consisting of Mn(II) bis(benzoinoxime), Mn(II) bis(anisoinoxime), Mn(II) bis(paradimethylaminobenzoinoxime), and combinations thereof.

6. The catalyst system of claim 1, wherein the base is an alkali metal hydroxide.

7. The catalyst system of claim 1, wherein the unsaturated compound of component (d) is selected from the group consisting of chalcone, trans-dibenzoylethylene, 3-butyne-2-one, dibenzoylmethane, and ethyl vinyl ether.

8. The catalyst system of claim 1, wherein the unsaturated compound is present at a mole ratio, with respect to the 2,6-disubstituted phenol, of from about 1:1000 to about 20:1000.

9. The catalyst system of claim 1, wherein the phase transfer agent of component (e) is a quaternary ammonium compound.

10. The catalyst system of claim 1, wherein said manganese compound comprises a manganese chelate of benzoin oxime.

11. The catalyst system of claim 1, wherein said substantially water-soluble base comprises at least one alkali metal carbonate.

12. The catalyst system of claim 6, wherein said alkali metal hydroxide comprises lithium, sodium, calcium, or potassium hydroxide.

13. The catalyst system of claim 1 wherein said base comprises a quaternary ammonium hydroxide.

14. The catalyst system of claim 1, wherein the amount of said base is sufficient to permit the reaction mixture to stay alkalkine through the course of the reaction.

15. The catalyst system of claim 14, wherein the amount of said base ranges from about 1 mole of base per 500 moles of phenol to about 50 mole of base per 500 moles of phenol.

* * * * *